United States Patent [19]
Boese et al.

[11] Patent Number: 6,102,489
[45] Date of Patent: Aug. 15, 2000

[54] WHEEL SUPPORT ARRANGEMENT FOR A VEHICLE DRIVE AXLE

[75] Inventors: Wolfgang Boese, Altbach; Gerhard Hammerle, Winnenden; Lothar Noll, Waiblingen, all of Germany

[73] Assignee: DaimlerChrysler AG, Stuttgart, Germany

[21] Appl. No.: 08/871,725

[22] Filed: Jun. 9, 1997

[51] Int. Cl.[7] ................................................. B60B 27/02
[52] U.S. Cl. ........................................ 301/137; 301/124.1
[58] Field of Search ............................ 301/105.1, 124.1, 301/125, 137, 35.62, 1; 74/607

[56] References Cited

U.S. PATENT DOCUMENTS

| | | | |
|---|---|---|---|
| 1,133,813 | 3/1915 | Marmon | 301/137 X |
| 1,196,408 | 8/1916 | Vestine | 301/105.1 X |
| 1,241,473 | 9/1917 | Altman | 301/105.1 X |
| 1,288,574 | 12/1918 | Harper | 301/124.1 |
| 1,401,582 | 12/1921 | Brush et al. | 301/105.1 X |
| 2,075,563 | 3/1937 | Alden | 301/35.62 X |
| 2,350,439 | 6/1944 | Wright | 301/1 X |
| 2,532,605 | 12/1950 | Castleberry | 301/1 |
| 4,986,608 | 1/1991 | Fett | 301/124.1 |

FOREIGN PATENT DOCUMENTS

| | | | |
|---|---|---|---|
| 2124166 | 2/1984 | United Kingdom | 301/137 |
| WO 95/13198 | 5/1995 | WIPO . | |

*Primary Examiner*—Russell D. Stormer
*Attorney, Agent, or Firm*—Klaus J. Bach

[57] ABSTRACT

In a wheel support arrangement of a vehicle drive axle with a hollow axle housing having outer ends on which wheel hubs are rotatably supported by bearings transmitting the wheel loads directly to the axle housing and drive shafts extending through the axle housings and having at their ends outside the axle housing drive shaft flanges connected to the hubs and brake discs or drums mounted on the inner ends of the wheel hubs, the wheel hubs and the outer bearing race ring have essentially the same axial length and the drive shaft flanges and the brake disc or drum flanges have inner diameters smaller than the outer diameter of the outer bearing race ring so as to firmly engage the outer bearing race ring between the drive shaft and the brake disc or drum flanges.

5 Claims, 1 Drawing Sheet

WHEEL SUPPORT ARRANGEMENT FOR A VEHICLE DRIVE AXLE

BACKGROUND OF THE INVENTION

The invention relates to wheel support arrangement for driven wheels on a hollow axle to which the wheel loads are transferred and which receives a drive shaft for driving the wheels. A roller bearing is mounted on each end of the drive axle and supports a wheel hub with at least one brake disc or drum to which a flange formed at the end of the drive shaft extending from the hollow axle is connected.

WO 95/13198 discloses such a wheel support arrangement wherein a wheel hub is supported on an axle housing by means of a double ring cone bearing. The outer race ring of the cone bearing is provided with a flange to which, from the outer end of the axle, a brake disc and a wheel hub are bolted, one on top of the other.

Such an arrangement however, has several disadvantages:

It requires that the flange is provided with a bearing race and it consequently needs to be made of roller bearing steel. The flange supports the brake disc and the wheel hub and has a relatively large diameter for supporting the wheel hub and the brake flange and for distributing the wheel load to the bearing so that a relatively large amount of bearing steel is required.

Because the flange is part of the bearing race, the wheel cannot be disposed in the axial center of the bearing so that a central wheel load transfer through the bearing is not possible. Furthermore, the heat from the brake disc is conducted directly to the outer bearing race whereby the bearing play and the lubricant consumption are increased.

It is therefore the object of the present invention to provide a wheel support arrangement which, utilizing a flange-free roller bearing, requires no abutment or support shoulders which have to be machined, on the wheel hub nor on the brake parts flanged thereto, nor on the drive shaft flange also connected to the wheel hub. There should be no need for other axial retaining means for the outer bearing race such as retaining rings nuts or distance rings. Furthermore, the wheel support arrangement should be relatively small in width and diameter and should require as little space as possible. Simple assembly is also desirable and all the disadvantages mentioned in connection with the state of the art referred to earlier should be avoided.

SUMMARY OF THE INVENTION

In a wheel support arrangement of a vehicle drive axle with a hollow axle housing having outer ends on which wheel hubs are rotatably supported by bearings transmitting the wheel loads directly to the axle housing and drive shafts extending through the axle housings and having at their ends outside the axle housing drive shaft flanges connected to the hubs and brake discs or drums mounted on the inner ends of the wheel hubs, the wheel hubs and the outer bearing race ring have essentially the same axial length and the drive shaft flanges and the brake disc or drum flanges have inner diameters smaller than the outer diameter of the outer bearing race ring so as to firmly engage the outer bearing race ring between the drive shaft and the brake disc or drum flanges.

The wheel hub and the outer anti-friction bearing ring received in the central bore in the wheel hub are engaged between the flange side front face of a brake component and the drive shaft flange surfaces. Since the wheel hub has in the area of these components the same width as the outer anti-friction bearing race ring—plus a manufacturing tolerance—the opposite faces of the brake component and of the drive shaft flange form the axial stops for the outer bearing race ring.

The face areas engaging the opposite axial ends of the wheel hub are designated planar envelope surfaces since they are provided with several recesses for minimizing heat transfer and for the removal of lubricant leaking from the bearing etc.

The wheel support arrangement according to the invention is easy to assemble, it is compact and provides for a short wheel hub inspite of using a regular compact size anti-friction bearing. The relative short wheel hub also uses a shorter length drive shaft. Consequently, with a given load-carrying capability of the axle, the mass inertia of the rotating drive wheel and the drive components and also the weight of the axle are reduced. Consequently, also the dynamic behavior of the axle is improved.

Further features of the invention will become apparent from the following description of the invention on the basis of the attached figure.

BRIEF DESCRIPTION OF THE DRAWING

The single FIGURE is an axial cross-sectional view of a wheel support arrangement with a double-row cone roller bearing.

DESCRIPTION OF A PREFERRED EMBODIMENT

Figure 1:
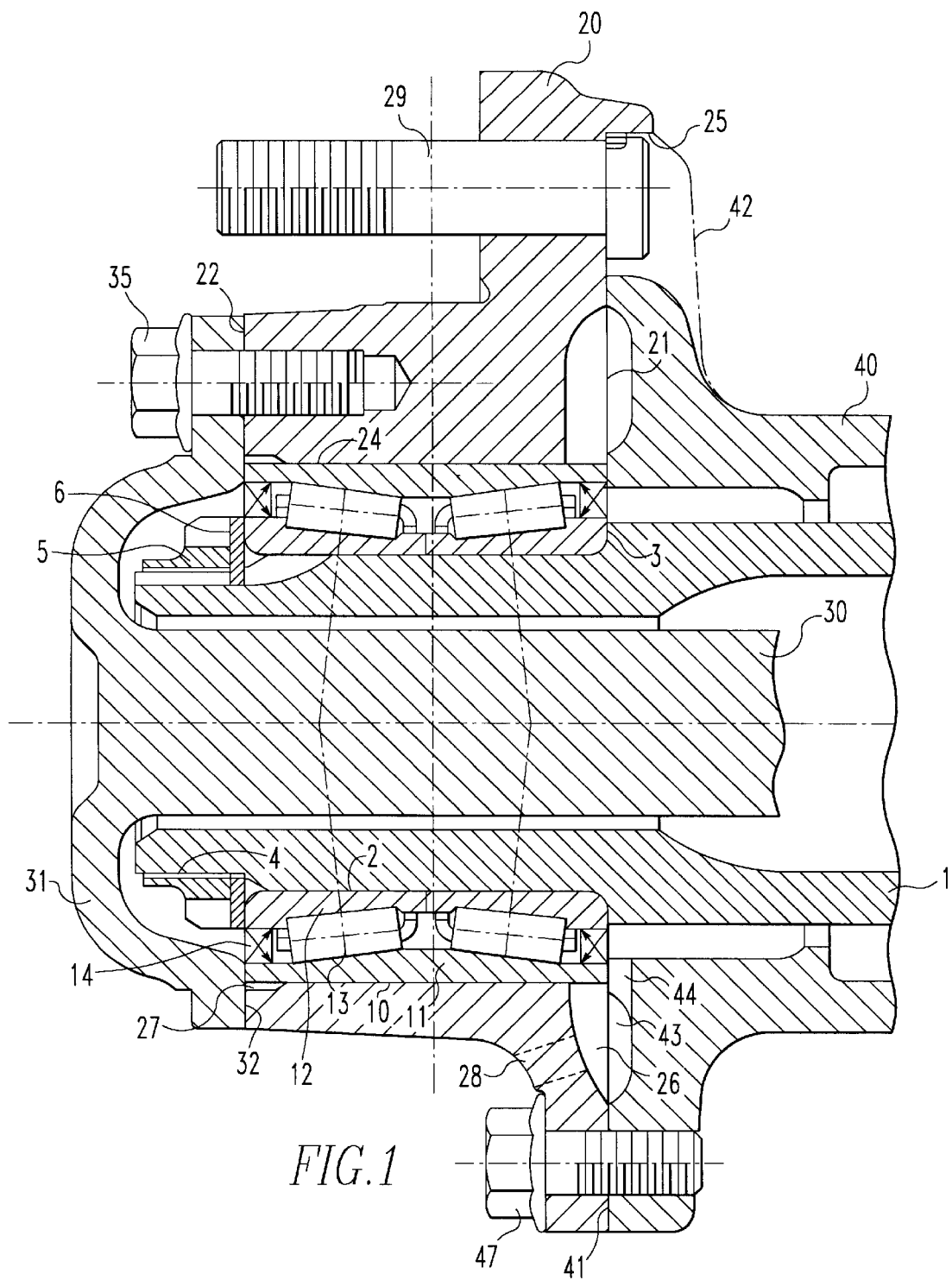

The FIGURE shows a wheel support arrangement for a so-called live drive axle. With this rigid axle type each drive wheel is supported by way of an anti-friction bearing 10 on an axle housing 1 on which the vehicle body is supported by springs. A drive shaft 30 extending through the axle housing is generally not subjected to any load but only transmits the drive torque to the drive wheels.

In the embodiment as shown in the FIGURE, the hollow axle housing 1 which tapers down toward its axial outer end and which may also be part of a steerable axle, forms, at its outer end, a bearing seat 2. The bearing seat 2 is limited at one end toward the center of the axle by an axle housing shoulder 3 and, at its outer end by a thread 4. On the bearing seat 2, two inner bearing race rings 12 are disposed which are part of a cone roller bearing 10. The inner bearing race rings 12 are clamped, by means of a wheel nut 5 and a non-rotatable mounting washer 6, against the axle body shoulder 3.

A wheel hub 20 is supported on an outer bearing race ring 11 which has a cylindrical outer surface, and which is rotatably supported on the inner bearing race ring 12 by rollers 13. The end faces of the cone roller bearing are sealed by two bearing seal rings 14.

At the inner side of the wheel hub 20 directed toward the center of the axle, a flange 40 of a brake disc is mounted to the hub 20 by bolts 47. In the area of the mounting jointure 21, 41 of the brake disc flange 40 and the wheel hub 20, the two components have a planar surface area extending normal to the axis of rotation of the wheel hub 20.

As shown in the FIGURE at the upper end of the hub 20, one of several wheel mounting bolts 29 is supported by the hub 20. The heads of the bolts are also disposed adjacent the planar end face of the hub 20. In the area of the heads, the brake disc flange 40 has recesses (see the dash-dotted contour 42 of the brake disc flange 40). Near the outer edge of the wheel hub, there is provided a shoulder 25 for centering the brake disc flange 40 on the wheel hub 20.

The wheel mounting bolt 29 is pressed into the wheel hub 20 so that it is rotationally fixed.

At least one wheel (not shown) can be mounted on the hub 20 by means of the bolts 29.

The inner diameter of the brake disc flange 40 is smaller than the diameter of the wheel hub bore 24 so that the brake disc flange 40 can serve as axial stop for the outer bearing race ring 11 of the cone roller bearing 10.

The wheel hub 20 has, in the area of the inner mounting jointure 21, 41, a recess 26 adjacent which also the brake disc flange 40 is provided with a recess 43.

The brake disc flange 40 has a channel 44 and the wheel hub 20 has a bore 28 (shown in the FIGURE at the bottom adjacent the bolt 47 by dashed lines), which provide a passage leading to the outside in order to discharge any bearing lubricant leakage away from the brake dic.

On the outside, the wheel hub 20 is connected, by way of a drive shaft flange 31, to the drive shaft 30 which is disposed in the hollow axle housing 1. The drive shaft flange 31 is firmly mounted to the hub 20 by means of bolts 35. Also at this side, the wheel hub 20 and the drive shaft flange 31 have planar end faces forming a mounting plane 22, 32 extending normal to the axis of rotation of the wheel hub 20 and the drive shaft 30. Again, the inner diameter of the planar end face of the drive shaft flange 31 is smaller than the inner diameter of the hub bore 24, that is, it is about the same as the inner diameter of the outer bearing race ring 11 so that also the drive shaft flange 31 forms an axial stop for the outer bearing race ring 11.

The wheel hub 20 has, at its axial outer end, an annular recess 27 which, like the recess 26, extends axially inwardly up to a point close to the support area of he outer bearing race ring 11. The two recesses 26 and 27 reduce the area for which accurate machining for forming the bearing seating surface is required to the necessary axial length.

For mounting the wheel support structure, the wheel hub 20 is first bolted to the brake disc or, rather, the flange 40 thereof. Then the cone roller bearing 10 is pressed into the wheel hub bore 24 until it abuts the brake disc flange 40. The two outer end faces of the wheel hub 20 and of the cone roller bearing 10 are essentially in radial alignment. By providing appropriate tolerances for the width of the outer bearing race ring 11 and the wheel hub 20, it is made sure that the outer race ring 11 of the cone roller bearing 10 does not extend beyond the planar end face 22 of the wheel hub 20. As maximum axial play for the cone roller bearing for example 150 μm are provided.

The assemblage of the wheel hub 20, the brake disc and the cone roller bearing 10 is then placed over the axle housing 1 and, after insertion of the mounting washer 6, firmly mounted by the wheel nut 5 which is secured by safety means. Finally, the drive shaft 30 is inserted into the axle housing 1 and the drive shaft flange 31 is bolted onto the wheel hub 20.

What is claimed is:

1. A wheel support arrangement of a vehicle drive axle comprising: a hollow axle housing taking up any wheel loads and having outer ends on which anti-friction bearings with outer and inner bearing race rings are supported, a wheel hub with a brake disc or drum rotatably supported on said hollow axle housing by said bearing, and a drive shaft extending through said hollow axle housing and having an outer end disposed outside said hollow axle housing and provided with a drive shaft flange connected to said wheel hub for driving said wheel hub, said wheel hub having an axial width corresponding to the axial length of said outer bearing race ring and said brake disc or drum having a flange by which said brake disc or drum is mounted to said wheel hub, said outer bearing race ring having an outer diameter and said brake disc flange and said drive shaft flange having inner diameters smaller than the outer diameter of said outer bearing race ring so as to firmly engage therebetween the opposite ends of said outer bearing race ring.

2. A wheel support arrangement according to claim 1, wherein said wheel hub has a planar inner end face and wheel mounting bolts extend through said hub and have heads abutting said planar inner end face of said wheel hub.

3. A wheel support arrangement according to claim 1, wherein said brake disc or drum flange includes recesses for receiving said wheel bolt heads.

4. A wheel support arrangement according to claim 1, wherein said wheel hub has planar end surfaces at its opposite axial ends and at least one of the two planar end surfaces of said wheel hub has recesses formed therein.

5. A wheel support arrangement according to claim 1, wherein said outer bearing race ring has essentially the same axial width as the inner bearing race ring or rings.

* * * * *